United States Patent
Pribonic et al.

(10) Patent No.: US 6,918,469 B1
(45) Date of Patent: Jul. 19, 2005

(54) CURVILINEAR EDDY CURRENT BRAKING APPARATUS

(75) Inventors: Edward M. Pribonic, Seal Beach, CA (US); Marc T. Thompson, Watertown, MA (US)

(73) Assignee: Magnetar Technologies, Inc., Seal Beach, CA (US)

( * ) Notice: Subject to any disclaimer, the term of this patent is extended or adjusted under 35 U.S.C. 154(b) by 356 days.

(21) Appl. No.: 10/318,506

(22) Filed: Dec. 13, 2002

Related U.S. Application Data

(63) Continuation of application No. 09/779,309, filed on Feb. 8, 2001, now Pat. No. 6,523,650, which is a continuation-in-part of application No. 09/504,575, filed on Feb. 15, 2000, now Pat. No. 6,533,083.

(51) Int. Cl.[7] ................................................. B60L 7/00
(52) U.S. Cl. ....................................................... 188/165
(58) Field of Search ................................ 188/158, 159, 188/161, 164, 165; 104/281, 283, 284; 105/73, 77

(56) References Cited

U.S. PATENT DOCUMENTS

| | | | | |
|---|---|---|---|---|
| 3,828,686 A | * | 8/1974 | Steenbeck et al. | 104/130.02 |
| 4,516,505 A | * | 5/1985 | Heidelberg | 104/284 |
| 5,127,599 A | * | 7/1992 | Veraart | 246/182 R |
| 5,722,326 A | * | 3/1998 | Post | 104/281 |
| 5,778,797 A | * | 7/1998 | Mutaguchi et al. | 105/149.1 |
| 5,862,891 A | * | 1/1999 | Kroger et al. | 188/165 |
| 6,062,350 A | * | 5/2000 | Spieldiener et al. | 188/161 |
| 6,104,108 A | * | 8/2000 | Hazelton et al. | 310/12 |
| 6,523,650 B1 | * | 2/2003 | Pribonic et al. | 188/165 |
| 6,533,083 B1 | * | 3/2003 | Pribonic et al. | 188/165 |

* cited by examiner

*Primary Examiner*—Xuan Lan Nguyen
(74) *Attorney, Agent, or Firm*—Walter A. Hackler

(57) ABSTRACT

Eddy current braking apparatus includes an array of spaced apart permanent magnets and a plurality of flux steering magnets may be disposed in gaps between the spaced apart permanent magnets. The flux steering magnets are orientated in a manner to provide a steering flux polarity that is rotated about 90 with respect to a polarity magnet flux of the spaced apart permanent magnets in order to increase the flux density in the air gap which results in better performance of the brake. Alternatively, cubic magnets may be used with each magnet being arranged to provide a change in flux polarity between adjoining magnets. An electrically conductive member is provided for engaging the magnetic flux provided by the array of permanent magnets and the magnets and conductive member are mounted for enabling relative motion between the magnet and the conductive member to produce eddy currents in the conductive member and resulting in a braking force between the magnets and the conductive member.

26 Claims, 4 Drawing Sheets

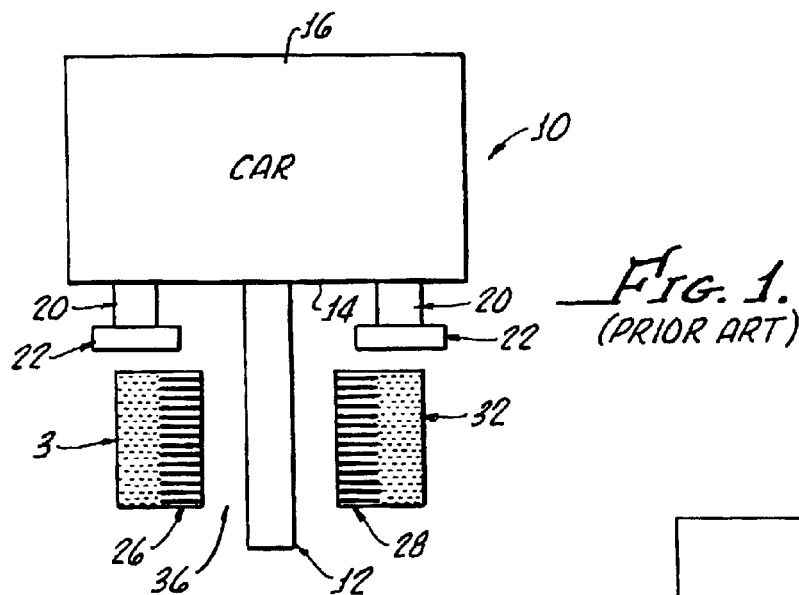
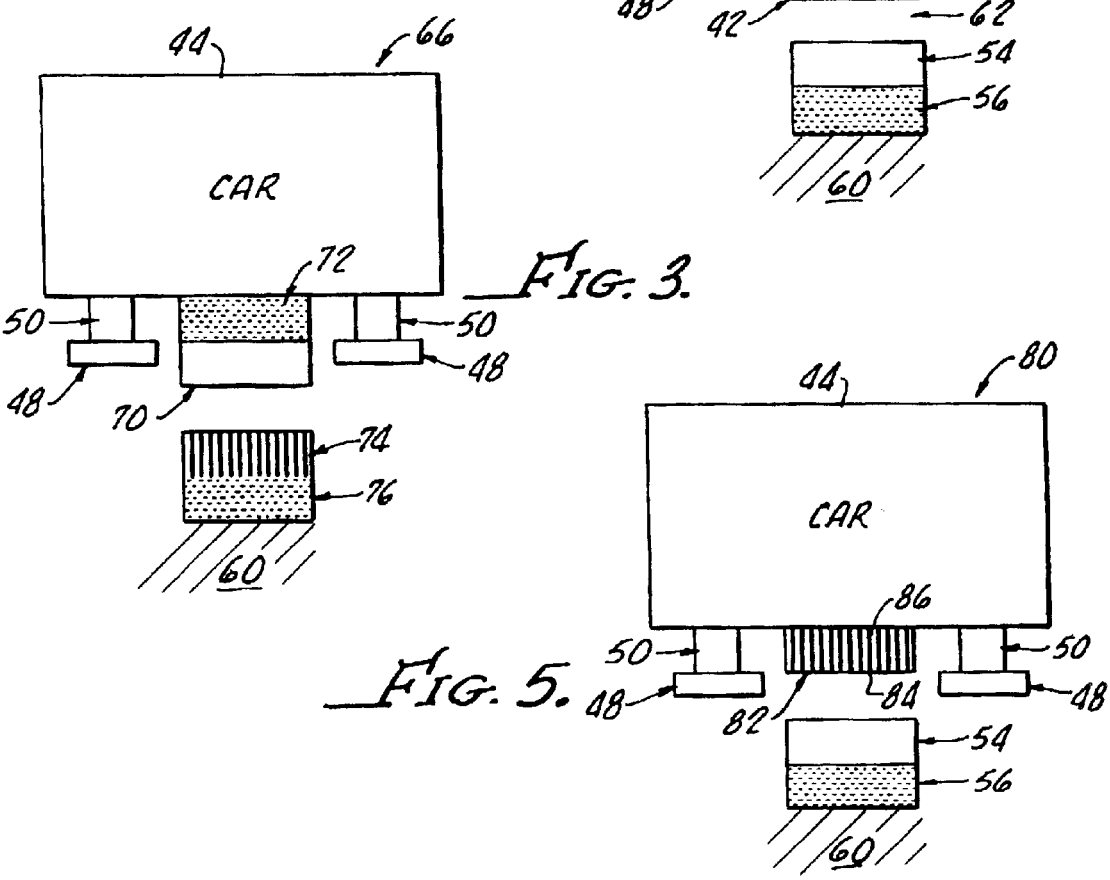

CURVILINEAR EDDY CURRENT BRAKING APPARATUS

The present application is a continuation of U.S. Ser. No. 09/779,309 filed Feb. 8, 2001 now U.S. Pat. No. 6,523,650 which is a continuation-in-part of U.S. Ser. No. 09/504,575 filed Feb. 15, 2000 now U.S. Pat. No. 6,533,083.

The present invention is generally related to permanent magnet linear brakes and is more particularly directed to eddy brake systems for movable cars, for example, rail supported cars, go-carts, elevator cars, conveyor cars, and roller coaster cars, among others.

As a specific example, the majority of hereinbefore constructed entertainment rides, such as roller coasters, have relied on friction brakes for deceleration and stopping of wheel-mounted cars. However, due to friction, such brakes are subject to wear and must be regularly monitored and serviced to maintain proper operating conditions.

Linear eddy current brakes would be a preferable replacement for such friction brakes inasmuch as no contact is made with the rail for braking and consequently, they are free from wear due to friction. Eddy current brakes are based on the law of induction. When a conductive member is moved through a magnetic field, eddy currents are generated in the member and a secondary magnetic field caused by the eddy currents is opposed to the magnetic field through which the member passes. The resulting force component acts opposite to the traveling direction of the member.

Electromagnetic coils may be utilized to generate the magnetic field for inducing eddy currents in the moving member, however, such electromagnetic systems require elaborate controllers in order to excite the coils at a proper time to effect the braking. Accordingly, it is more preferable to effect eddy current braking through the use of permanent magnets.

Hereinbefore mentioned, a permanent magnetic linear eddy current brake systems has utilized two arrays from magnets attached to stationary rails with a conducting fin disposed on a moving object and arranged to pass through a gap provided between the two arrays of magnets. As the fin is passed through the magnet arrays, an electric eddy current is induced therein which reverses as the fin passes from a magnet of one polarity to a magnet of opposite polarity. As hereinabove noted, a force is then created and exerted on the fin which causes a braking force. Other prior art devices include Free Fall Towers which utilizes two arrays of magnets on a car which travels along a stationary fin.

The hereinbefore linear braking systems have utilized two arrays of permanent magnets spaced apart from one another to establish a channel or gap there between the passage of a fin. This structural limitation limits such braking systems to applications on linear, or straight rail sections. Accordingly, there is a need for an eddy current braking systems which can be utilized on curvilinear rail sections and further, it is desirable to utilize a single array of permanent magnets in an eddy current braking system in order to reduce the cost thereof.

SUMMARY OF THE INVENTION

Eddy current braking apparatus, in accordance with the present invention, generally includes a single array of permanent magnets which provides a magnetic flux and a plurality of flux steering magnets disposed in gaps between said spaced apart permanent magnets. The flux steering magnets are oriented in a manner to provide a steering flux polarity that is rotated about 90° with respect to a polarity of the magnetic flux of said spaced apart permanent magnets.

An electrically conductive means is utilized for exclusively engaging the magnetic flux provided by the single array of permanent magnets.

Means are provided, mounting the magnets and the conductive means, for enabling relative motion between the magnets and the conductive means in order to produce eddy currents in the conductive means which result in a braking force between the magnets and the conductive means.

More particularly, the present invention may include a car with the magnets disposed on the car and the conductive means being stationary. In this instance, the conductive means is not limited to a linear configuration but may, in fact, be disposed in a curvilinear relationship. The car in this instance is guided along the appropriate curvilinear path.

Alternatively, the present invention may provide for the conductive means to be disposed in the car and the array of permanent magnets in a stationary position. In this instance, the array of permanent magnets may be disposed in a curvilinear arrangement with an appropriate guiding of the car along the curvilinear path.

In another embodiment of the present invention, eddy current braking apparatus for a guided car is provided which includes first magnet means for providing a magnet flux with the first magnet means consisting of a first single array of permanent magnets and a plurality of first flux steering magnets disposed in gaps between said first spaced apart permanent magnets. The first flux steering magnets are oriented in a manner to provide a steering flux polarity that is rotated about 90° with respect to a polarity of the magnetic flux of said spaced apart first permanent magnets. A first electrically-conductive means is provided for exclusively engaging the magnetic flux provided by the first array of permanent magnets.

First means, mounting the first magnetic means and the first conductive means is provided for enabling relative motion between the first magnetic means and the first conductive means in order to produce eddy currents in the first conductive means resulting in a braking force between the first magnet means and the second conductive means.

Further second magnetic means are provided for producing a magnetic flux with the second magnet means consisting of a second single array of permanent magnets and a plurality of second flux steering magnets disposed in gaps between said second spaced apart permanent magnets. The second flux steering magnets are oriented in a manner to provide a steering flux polarity that is rotated about 90° with respect to a polarity of the magnetic flux of said spaced apart second permanent magnets. A corresponding second, electrically conductive means is provided for exclusively engaging the second magnetic flux provided by the second single array permanent magnets.

Second means, mounting second magnet means and the second conductive means, is provided for enabling relative motion between the second magnet means and the second conductive means in order to produce eddy currents in the second conductive means resulting in a breaking force between the second magnet means and the second conductive means.

In one embodiment, the first and second magnet means may be disposed on opposite sides of the car and in another embodiment, the first and second conducted means are mounted on opposite sides of the guided car.

In yet another embodiment of the present invention, cubic permanent magnets may be utilized in a way with each permanent magnet being oriented with a flux polarity that is rotated about 45° or about 90° with respect to a flux polarity of an adjoining, or adjacent, permanent magnet. This special orientation of rotating magnetization vectors forces the magnetic field on one side of the magnet array which results in a significantly higher braking force than a standard array without back iron.

BRIEF DESCRIPTION OF THE DRAWINGS

The advantages and features of the present invention will be better understood by the following description when considered in conjunction with the accompanied drawings in which:

FIG. 1 is a representation of the prior art illustrating a car with a depending fin passing through a cap between two stationary arrays of permanent magnets;

FIG. 2 is a representation of one embodiment of the present invention generally showing a single array of permanent magnets attached to a car and disposed for movement past a stationary electrically conductive member;

FIG. 3 is a representation of another embodiment of the present invention similar to that shown in FIG. 2 in which the single array of permanent magnets is stationary and the electrically conductive member is attached to a car;

FIG. 5 is yet another embodiment of the present invention similar to FIGS. 2 and 3 and utilizing a Halbach permanent magnet arrangement;

DETAILED DESCRIPTION

Figure 4:
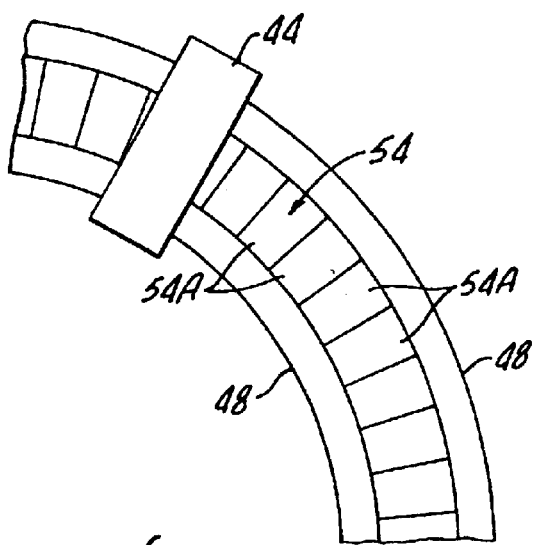
FIG. 4 is a plan view representation of the embodiment shown in FIG. 2 or 3, illustrating a curvilinear pattern of permanent magnets or conductive members.

With reference to FIG. 1, there is shown a representation 10 of prior art linear eddy current braking system which includes a conductive member, or fin, 12 fixed to an underside 14 of the car between wheels 20 which are supported by rails 22.

The prior system 10 is configured and arranged for causing the fin 12 to pass between two arrays 26, 28 of permanent magnets which abut a ferromagnetic back iron 30, 32 as is well known in the art. The magnet arrays 26, 28 and back irons 30, 32 are stationary and affixed to structure not shown in FIG. 1. Magnetic flux maintained in a gap 36 between the two magnet arrays 26, 28 is intercepted by the electrically conductive fin 12 for producing eddy currents therein and a braking force as is well known in the art.

Numerous variables affect the braking force in eddy current or electrodynamic braking as is well known in the art. These variables include:

| | |
|---|---|
| B, magnetic flux density | B, magnetic flux density a higher flux density results in a higher braking force with the braking force scaling as B3. The flux density at the conducting member depends on permanent magnet strength, integrity of the magnetic circuit, and airgap length |
| A, total magnet area | Braking force is proportional to $B^3 A$,. Hence a higher area of permanent magnets material results in proportionally higher braking force. |
| g, airgap | Airgap affects magnitude of the flux density. In general, operation at a smaller airgap g results in a higher magnetic flux density B and hence a higher braking force. |
| v, relative velocity between permanent magnets and fin | For a given magnet arrangement and conducting fin thickness there is an optimum velocity which maximizes the magnetic braking force. |
| T, conducting fin thickness | The conducting fin thickness T, magnetic pole spacing p, and electrical, σ of the fin also affecting the braking force. It is a multi-dimensional optimization problem to determine an optimal thickness, pole spacing and electrical conductivity. |
| P, pole pitch (distance between adjacent N and N poles in a magnet array) | |
| σ electrical conductivity of conducting fin | |

Limitations of the prior art devices, such as that shown in FIG. 1 which utilize two arrays of stationary permanent magnets and a movable fin, include cost because of the number of magnets necessary and further the structural limitations such as precise alignment of the arrays 26, 28 to form the narrow gap 36 through which the fin 12 must pass. It should be apparent that this prior art configuration would not be suitable for implementation along a curvilinear track, not shown in FIG. 1, supporting the car wheels 20.

The present invention is represented by the embodiment 40 shown in FIG. 2, includes a single array 42 of permanent magnets fixed to a car 44 with a back iron 46 disposed therebetween. Similar to the prior art 10, the car 40 may be supported by rails 48 and moveable therealong by wheels 50. It should be appreciated that while a rail guided care is shown in the Figure, the present invention is not limited thereto but is applicable to non-guided objects as well.

The single array 42 of permanent magnets is a means for providing a magnetic flux. An electrically conductive member 54 provides a means for exclusively engaging the magnetic flux provided by the single permanent magnet array 42. To enhance its effectiveness, the member 54 may be supported by the back iron 56 which is ferromagnetic and affixed to stationary supporting structure or ground 60.

The rails 48, wheels 50, and the ground in combination, provide a means, mounting the magnet array 42 and conductive member 54, for enabling relative motion between the magnet array 42 and the conductive member 54 to produce eddy currents in the conductive member 54 which results in a braking force between the magnet array 42 and the conductive member 54.

The size and number of the magnets in the array 42 as well as the size and configuration of the conductive member 54 and the back irons 46 56 and a gap 62 that between are configured for providing the required braking force and calculated in accordance with the variables heretofore set forth.

Turning now to FIG. 3, there is shown another embodiment 66 of the present invention with common reference numerals representing identical or substantially the same components as those shown in FIG. 2. In this embodiment 66, a conductive member 70 is coupled to the car 44, through a back iron 72 and an array 74 of permanent magnets is attached to the supporting structure 60 through a back iron 76. Principal operation of the embodiment 66 is identical to that of the embodiment 40 shown in FIG. 2.

Importantly, the embodiments 40, 66 in accordance with the present invention enable braking of the car 44 over curvilinear sections of track 48 as represented in FIG. 4. While the curvilinear relationship in the Figure is shown in two dimensions, three dimensional curvilinear rail or track may also be used in accordance with the present invention. Thus, curvilinear in the context of the present invention means curvature in two or three dimensions in this instance, the conductive member 54 is comprised of a plurality of the segments 54A centered between the curvilinear rails 48. It should be appreciated that while FIG. 4 shows the embodiment shown in FIG. 2 with the conductive members 54 being stationary in this configuration is also obtainable with the embodiment 66 in which the permanent magnets 74 are stationary and disposed between the rails 48.

Yet another embodiment 80 of the present invention is represented in FIG. 5 with common character references representing identical or substantially the same components as the embodiment 40 shown in FIG. 2. In the embodiment 80, a Halbach array 82 of permanent magnets is utilized. This arrangement of permanent magnets provides a greater flux on one side 84 of the array 82, than another side 86 which eliminates the necessity for any back iron such as with the standard array shown in FIG. 2. This permanent magnet array is well known, see "Design of Permanent Multiple Magnets with oriented rare earth cobalt material". K. Halbach; Nuclear Instruments & Methods, Vol. 169, 180 pp. 110.

It should also be appreciated that the ferromagnetic backing 56, 72 of the embodiments 40, 66 and 80, because of the magnetic coupling to the magnet array 42, 74 respectively, provides a means creating a holding force between the magnets 42, 84, the attached car and the back iron 56.

Thus, after a moving car is stopped by the breaking system, it can be held in place in a stopped position. This feature is not feasible with the prior art system again shown in FIG. 1.

Figure 6:
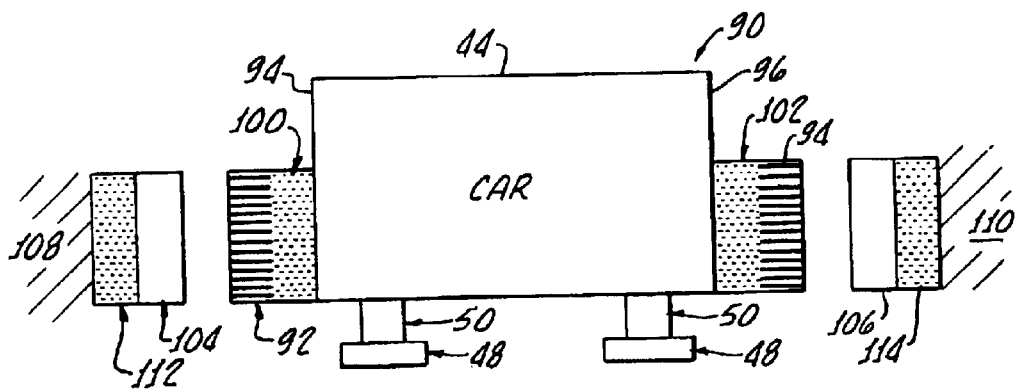
FIG. 6 is a representation of yet another embodiment of the present invention utilizing two arrays of permanent magnets each attached to opposite sides of a car, along with associated stationary electrically-conductive members.

Turning now to FIG. 6, there is shown another embodiment 90 in the present invention with character references shown in FIG. 6, representing identical or substantially similar components herein before discussed. The embodiment 90 includes two arrays 92, 94 of permanent magnets disposed on opposite sides 94, 46 of the car 44 and coupled thereto through back irons 100, 102.

Conductive members 104, 106 are affixed in the structure 108, 110 through back irons 112, 114. The principle of operation in the sizing of the magnets 92, 94 conductive members 104, 106 and back irons 112, 114 are in accordance with the principles herein above set forth.

Figure 7:
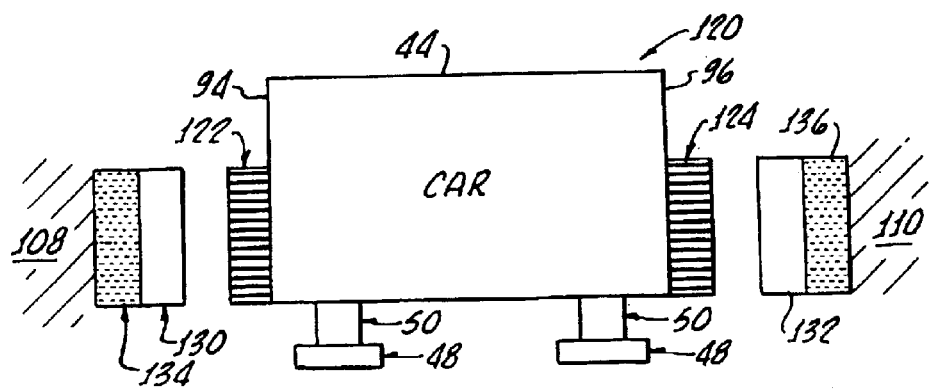
FIG. 7 is a representation of yet another embodiment of the present invention similar to that shown in FIG. 6 with the two arrays of permanent magnets being attached directly to the car without the use of back iron which is achieved through a specific arrangement of the permanent magnets known as a Halbach arrangement.

Yet another embodiment 112 shown in FIG. 7 with identical character references representing identical or substantially similar components as herein before discussed. The embodiment 120 utilizes Halbach permanent magnet arrangements 122, 124 attached to the opposite sides 94, 96 of the car 44, which eliminates the need for back iron. This aspect of the embodiment 120 is substantially the same as that described in FIG. 5, embodiment 80.

Conductive members 130, 132 attached through back irons 134, 136 to support the structure 108, 110 as hereinabove described.

Figure 8:
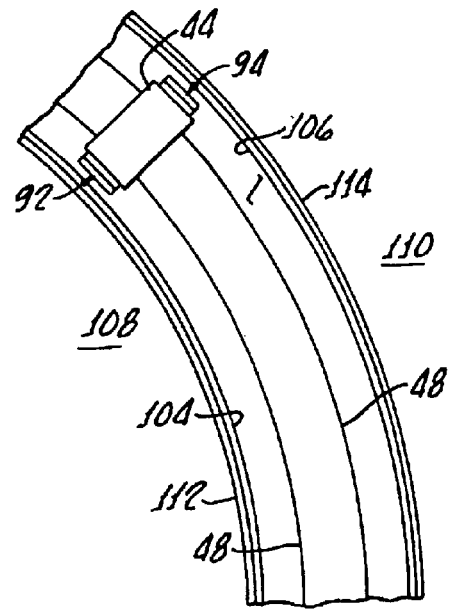
FIG. 8 is a plan view representation similar to that shown in FIG. 4, illustrating a curvilinear arrangement enabled by the configuration of new embodiment shown in FIGS. 6 and 7.

The embodiment shown in FIG. 7 also enables the use of curvilinear rails 48 as represented in FIG. 8 with identical character references representing identical or substantially similar components as shown in FIG. 6.

It should be appreciated that it is important to maximize the force per pound of permanent magnets 42, 72, 84, 122, 124 required. This importance is derived from the fact that in a permanent magnet brake, the material cost of the permanent magnet material is a large fraction of the total system cost. Accordingly, the present invention provides for improving the braking forces in order to minimize the total system cost.

Figure 9:
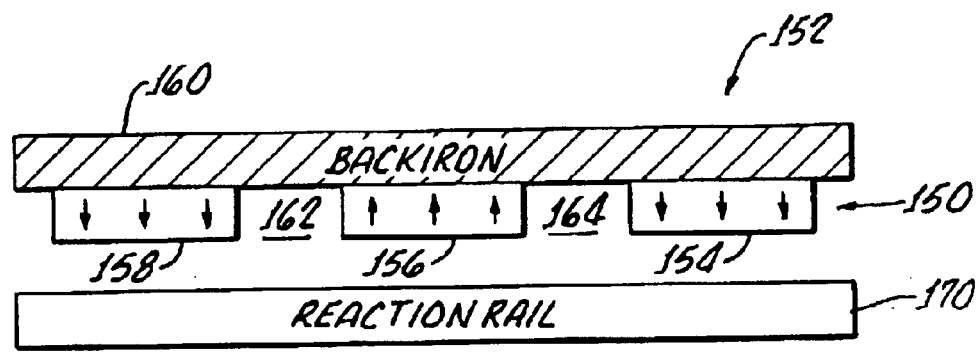
FIG. 9 is a representation of a prior art arrangement of permanent magnets.

For instruction purposes, a prior art permanent magnet array 150 is shown in FIG. 9 as part of a prior art braking system 152. In this system the array 150 of spaced apart magnets 154, 156, 158 are fixed to a back iron 160 in a spaced apart relationship with gaps 162, 164 therebetween. FIG. 9 is a representation only and only three magnets 154, 156, 158 are shown for explanatory purposes. Also represented is an electrically conductive means, or member 170 for engaging a magnet flux (not specifically indicated) provided by the single array 152 of permanent magnets 154, 156, 158.

Figure 10:
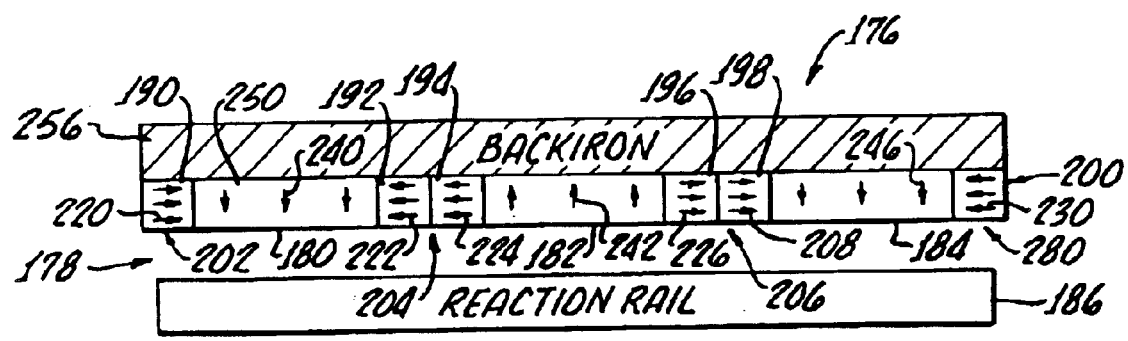
FIG. 10 is a representation of an arrangement of permanent magnets in accordance with the present invention with flux steering magnets disposed between the permanent magnets.

With reference now to FIG. 10 there is shown in representation form a braking system 176 which includes a magnet array 178 including magnets 180, 182, 184 along with a conductive means or member 186.

In accordance with the present invention, a plurality of flux steering magnets 190, 192, 194, 196, 198, 200 are provided and disposed in gaps 202, 204, 206, 208 between the spaced apart permanent magnets 180, 182, 184. Again, FIG. 10 shows only 3 permanent magnets 180, 182, 184 for representation purposes.

Importantly, the flux steering magnets 190, 192, 194, 196, 198, 200 are oriented in order to provide a steering flux polarity indicated by the arrows 220, 222, 224, 226, 228, 230 that is rotated about 90 with respect to a polarity, indicated by the arrows 240, 242, 246 of the magnetic flux of the spaced apart permanent magnets 180, 182, 184.

Placement of the flux steering magnets 190, 192, 194, 196, 198, 200 increases the flux density in the gaps 202, 204, 206, 208. This results in a higher force per unit pound of permanent magnet 180, 182, 184 as well as a higher force per unit length of the brake system 176. Accordingly, the use of the flux steering magnets 190, 192, 194, 196, 198, 200 results in increased system 176 performance and lower system 176 cost.

Another advantage of the flux steering magnets 190, 192, 194, 196, 200 is the fact that less flux on the top side 250 the array 176 requires less back iron 256, for a given amount of braking force. This is of importance with total system weight means to be minimized.

Figure 11:
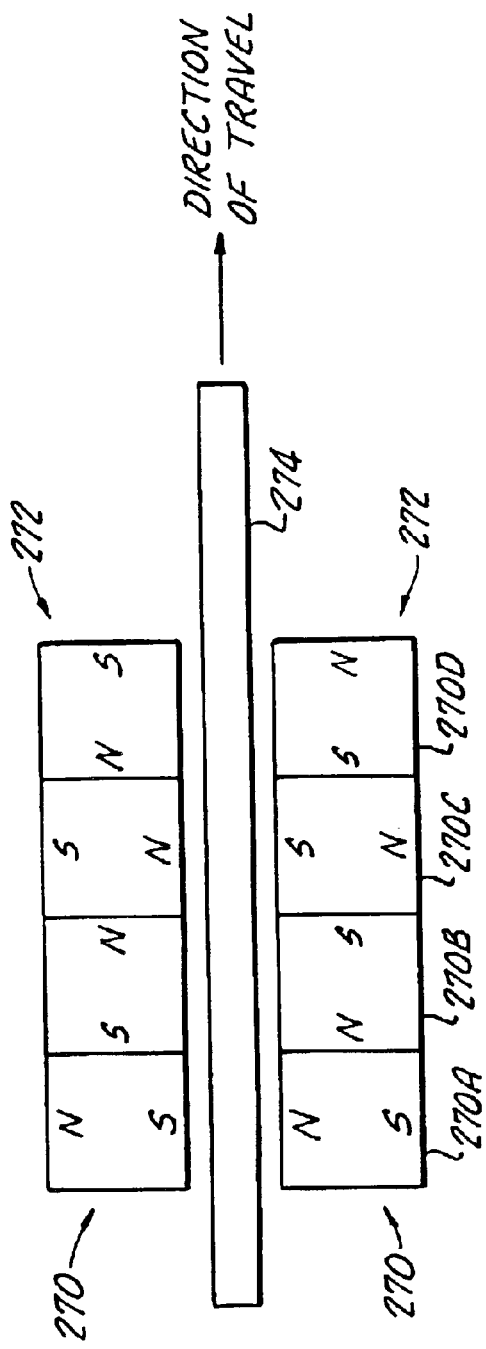
FIG. 11 is a representation of an array of cubic permanent magnets in accordance with the present invention with the magnet flux polarity between adjoining magnets being about 90°.

Further improvement may be obtained through the use of cubic magnets 270 in array 272 as shown in FIG. 11 along with a reaction rail, or conductive member, 274. The use of cubic magnets 270 facilitates manufacture since only one type of magnet 270 is required, i.e., the magnets 270 are cubic and identical.

Figure 12:
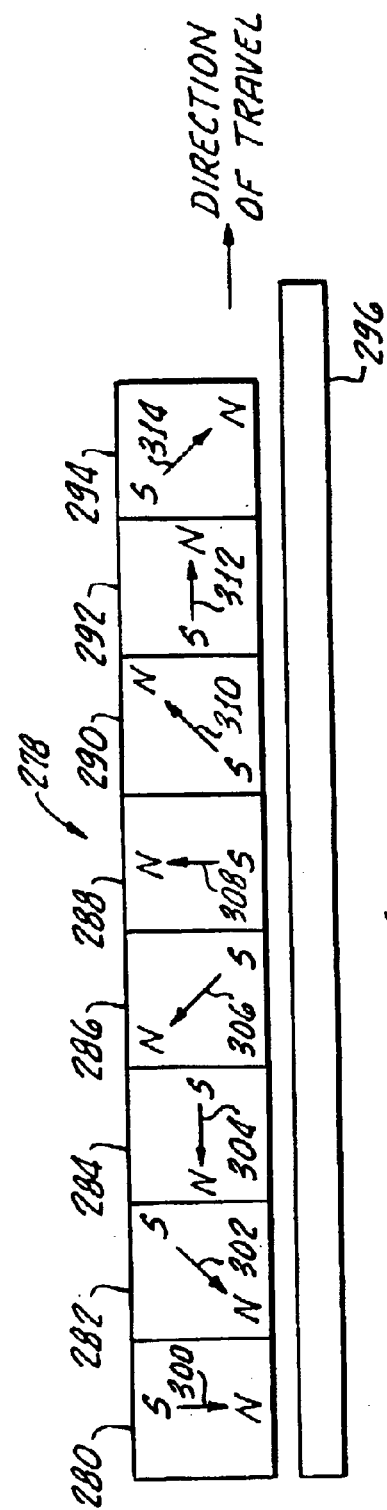
FIG. 12 is a representation of an array of cubic permanent magnets in accordance with the present invention with the magnet flux rotated between adjoining magnets being about 45°.

Still further improvement is obtained by assembling an array 278 of magnets 280–294 as shown in FIG. 12 along with a conductive member 296. The magnets 280–294 are cubic but have magnetization at a 45° angle with respect to adjacent magnets 280–294 as shown by the polarization arrays 300–314. As shown, there are 8 magnets 280–294 in the array 278. This is to be contrasted with the array 272 shown in FIG. 11 which includes four magnets 270A, 270B, 270C, 270D in the array 272.

It should be appreciated that multiple arrays 272 or 296 may be utilized in combination with one another. The rotating magnet arrays 272, 296 may be simply manufactured by sliding the cubic magnets 272, 280–294 into long thin-walled tubes (not shown). The resulting array 272, 296 is self-supporting and may be mounted either to a wayside (not shown) or to a moving vehicle (not shown).

Because the arrays 272, 275 do not use back iron, they are lighter than standard arrays 26, 28 as shown in FIG. 1. In addition, the arrays 272, 278 are self-shielding, hence there is very little strong magnetic field outside of the array 272, 278. This self shielding is accomplished without back iron.

It should be further appreciated that in FIG. 11, there is shown four magnets 270 is the array 272 and in FIG. 12 eight magnets 280–294 in the array 278. Other members of magnets (not shown) may be used in an array (not shown), such as 9 or 10, for example with appropriate magnetic flux orientation.

Although there has been hereinabove described Eddy current braking Apparatus in accordance with the present invention for the purpose of illustrating the manner in which the invention may be used to advantage, it will be appreciated that the invention is not limited thereto. Accordingly, all modifications, variation or equivalent arrangements which may occur those skilled in the art should be considered to be within the scope of the invention as defined in the appended claims.

What is claimed is:

1. Eddy current braking apparatus comprising:
   magnet means for providing a magnetic flux, said magnet means consisting of at least one array of permanent magnets and a plurality of flux steering magnets disposed in gaps between said spaced apart permanent magnets, said flux steering magnets being oriented in order to provide a steering flux polarity that is rotated about 90° with respect to a polarity of the magnetic flux of spaced apart permanent magnets;
   electrically conductive means for exclusively engaging the magnet flux provided by the permanent magnets; and
   means, mounting the magnet means and conductive means, for the enabling relative motion between the magnet means and conductive means to produce eddy currents in the conductive means resulting in a braking force between the magnet means and the conductive means.

2. The apparatus according to claim 1 further comprising a car with the magnet means being disposed on the car and the conductive means being stationery.

3. The apparatus according to claim 2 wherein the conductive means is curvilinear.

4. The apparatus according to claim 1 further comprising a car with the conductive means being disposed on the car and the array of permanent magnets being stationery.

5. The apparatus according to claim 4 wherein the array of permanent magnets is curvilinear.

6. The apparatus according to claim 1 where said flux steering magnets are smaller that the permanent magnets.

7. The apparatus according to claim 6 wherein at least two flux steering magnets are disposed in the gap between permanent magnets.

8. The apparatus according to claim 7 wherein each flux steering magnets is less than half the size of each of the permanent magnets.

9. The apparatus according to claims 8 wherein each two flux steering magnets disposed between permanent magnets have flux polarization at 180 degrees to one another.

10. The apparatus according to claim 9 wherein all of the steering magnets and permanent magnets are of approximately equal thickness.

11. Eddy current braking apparatus comprising:
    magnet means for providing a magnetic flux, said magnet means consisting of an array of cubic permanent magnets, each permanent magnet being oriented with a flux polarity that is rotated about 90° with respect to a flux polarity of an adjoining permanent magnet;
    electrically conductive means for exclusively engaging the magnet flux provided by the array of permanent magnets; and
    means, mounting the magnet means and conductive means, for the enabling relative motion between the magnet means and conductive means to produce eddy currents in the conductive means resulting in a braking force between the magnet means and the conductive means.

12. The apparatus according to claim 11 further comprising a car with the magnet means being disposed on the car and the conductive means being stationery.

13. The apparatus according to claim 12 wherein the conductive means is curvilinear.

14. The apparatus according to claim 11 further comprising a car with the conductive means being disposed on the car and the array of permanent magnets being stationery.

15. The apparatus according to claim 14 wherein the array of permanent magnets is curvilinear.

16. Eddy current braking apparatus comprising:
    magnet means for providing a magnetic flux, said magnet means consisting of an array of cubic permanent magnets each permanent magnet being oriented with a flux polarity that is rotated about 45° with respect to a flux polarity of an adjoining permanent magnet;
    electrically conductive means for exclusively engaging the magnet flux provided by the array of permanent magnets; and
    means, mounting the magnet means and conductive means, for the enabling relative motion between the magnet means and conductive means to produce eddy currents in the conductive means resulting in a braking force between the magnet means and the conductive means.

17. The apparatus according to claim 16 further comprising a car with the magnet means being disposed on the car and the conductive means being stationery.

18. The apparatus according to claim 17 wherein the conductive means is curvilinear.

19. The apparatus according to claim 16 further comprising a car with the conductive means being disposed on the car and the array of permanent magnets being stationery.

20. The apparatus according to claim 19 wherein the array of permanent magnets is curvilinear.

21. Eddy current braking apparatus for a rail mounted car, the apparatus comprising:

a car moveable along at least one rail; the rail being disposed in a curvilinear pattern about a vertical reference;

magnet means, disposed on the car, for providing a magnetic flux, said magnet means consisting of a single array of magnets; and conductive means disposed in a curvilinear pattern exterior to the car about the vertical reference, for engaging the magnetic flux and causing movement of the car along the rail to produce eddy currents in the conductive means resulting in a braking force between the magnet means and the conductive means.

22. The apparatus according to claim 21 wherein the conductive means is disposed proximate the rail.

23. Eddy current braking apparatus for a rail mounted car, the apparatus comprising:

a car moveable along at least one rail; the rail being disposed in a curvilinear pattern about a vertical reference;

magnet means, disposed in a curvilinear pattern exterior to the car about the vertical reference, for providing a magnetic flux, said magnet means consisting of a single array of permanent magnets;

conductive means, disposed on the car, for engaging the magnetic flux and causing movement of the car along the rail to produce eddy currents in the conductive means resulting in a braking force between the magnet means and the conductive means.

24. The apparatus according to claim 23 wherein the array of permanent magnet is disposed proximate the rail.

25. Eddy current braking apparatus for a rail mounted car, the apparatus comprising:

a car moveable along at least one rail;

magnet means, disposed on the car, for providing a magnetic flux, said magnet means consisting of a single array of permanent magnets; and conductive means disposed in a curvilinear pattern exterior to the car and on opposite sides of the car, for engaging the magnetic flux and causing movement of the car along the rail to produce eddy currents in the conductive means resulting in a braking force between the magnet means and the conductive means.

26. Eddy current braking apparatus for a rail mounted car, the apparatus comprising:

a car moveable along at least one rail;

magnet means, disposed in a curvilinear pattern exterior to the car and on opposite sides of the car, for providing a magnetic flux, said magnet means consisting of a single array of permanent magnets;

conductive means, disposed on the car, for engaging the magnetic flux and causing movement of the car along the rail to produce eddy currents in the conductive means resulting in a braking force between the magnet means and the conductive means.

\* \* \* \* \*